3,575,815
APPARATUS FOR THE DISTILLATION PURIFICATION OF DIPHENYL COMPOUNDS
Charles E. Sech, 5993 Winans Lake Road,
Brighton, Mich. 48116
Filed Jan. 29, 1969, Ser. No. 794,879
Int. Cl. B01d 3/00
U.S. Cl. 202—176     10 Claims

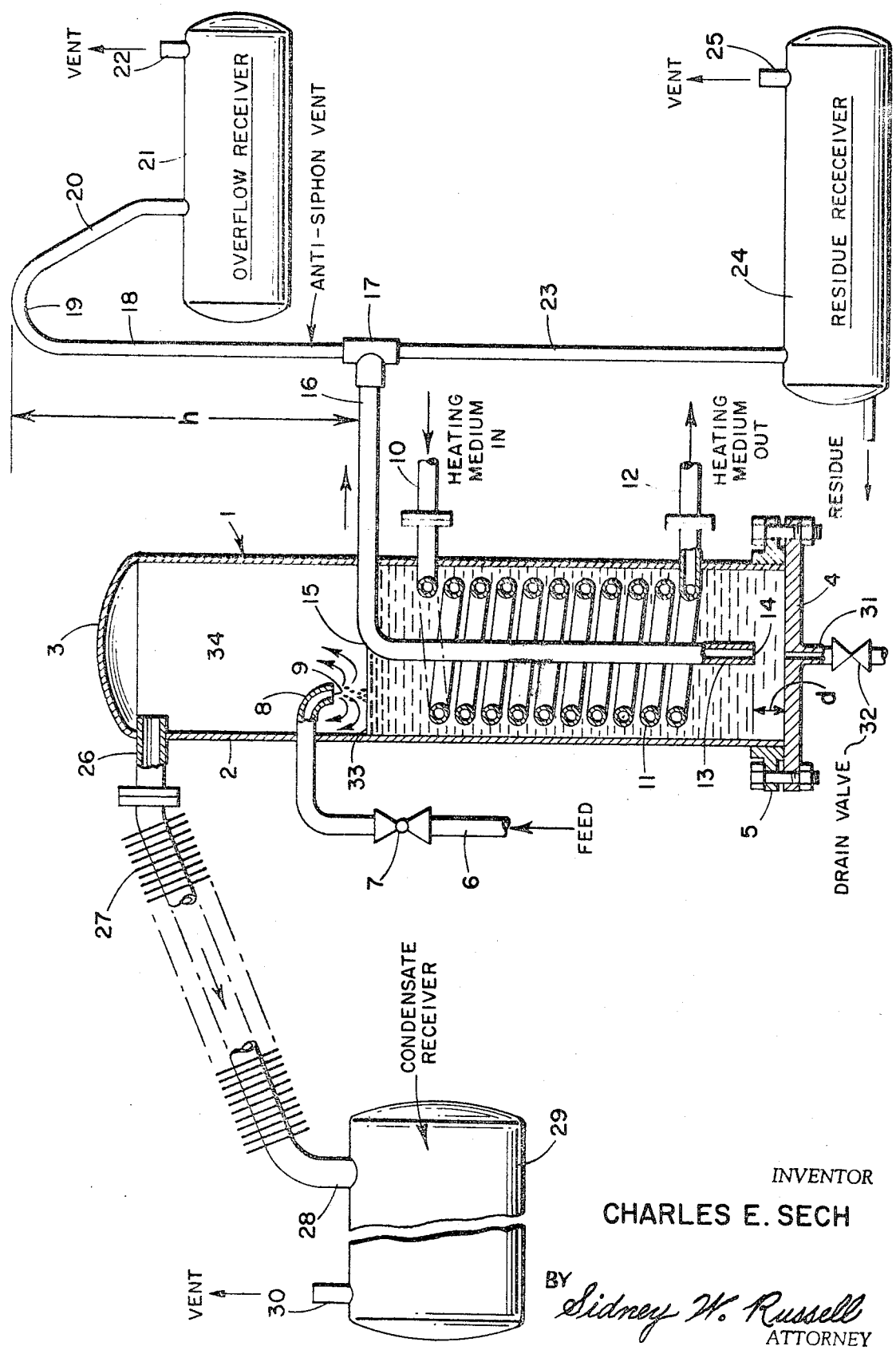

ABSTRACT OF THE DISCLOSURE

A single stage non-externally refluxed still especially designed for the distillation purification of heat transfer fluids such as diphenyl, diphenyl ether and mixtures thereof which are contaminated with high boiling thermal decomposition products. Principal features include: an internal helical heating coil; an internal wellpipe for withdrawal of liquid bottoms as well as continuous scavenging of particulate solids; and anti-siphon protection. The apparatus embodies a compact design and affords positive inventory control without need for liquid level instrumentation.

BACKGROUND OF INVENTION AND PRIOR ART

Polyphenyl compounds, especially diphenyl, diphenyl ether and halogenated derivatives thereof, are widely employed as heat transfer fluids. Exemplary of such materials are diphenyl ether or a eutectic mixture of diphenyl ether and diphenyl marketed commercially under the trademarks "Dowtherm" and "Dowtherm A." Uses for and properties of these polyphenyl compounds are well documented in the literature: see, for example, U.S. Pat. No. 2,000,886 dealing with the use of diphenyl ether as a heat transfer fluid. Polyphenyl compositions suitable as heating media generally exhibit a low vapor pressure, a nearly constant boiling point, excellent heat transfer characteristics and good thermal stability. They will find application wherever close process temperature control is a prime requisite.

The heat transfer fluid is usualy utilized in a closed recirculating cycle between a central heat source, on the one hand, and one or more heat sinks or process uses on the other. The heat sink may be, for example, the reboiler of a fractionating column, a jacketed autoclave, a steam generator, etc. The heating fluid may be used in either the vapor or liquid state. Notwithstanding good thermal stability, however, polyphenyls are nevertheless prone to undergo thermal degradation over a long period of use to form high boiling thermal decomposition products. If allowed to accumulate in the system, the high boiling contaminants would eventually render the entire polyphenyl inventory unfit for further use. Therefore, it is desirable and customary to provide a means for the continuous or semi-continuous purification of the polyphenyl compounds. One such system is described in U.S. Pat. No. 3,113,090, relating to the continuous on-line distillation purification of circulating polyphenyl wherein a slip stream of polyphenyls is flashed to a still which is reboiled by a separate stream of polyphenyls.

In carrying out the distillation purification of Dowtherm A or other polyphenyl heat transfer fluid, the impure polyphenyl comprises the feed to the still, purified heat transfer fluid is taken overhead, and the bottoms comprises high boiling decomposition products. Such stills are usually relatively small units, being designed for feed rates, say, of 50–500 lbs. per hour. Cost and size considerations therefore preclude the use of sophisticated level and flow control instrumentation such as is employed with refinery scale fractionating towers. Yet it is still important to retain a positive liquid level or inventory control capability in order to insure continuous operation of the still and to maintain equilibrium conditions therein. Another problem peculiar to this environment is the presence in the bottoms of particulate solids. For example, when Dowtherm A is overheated severely, small particles of solid carbon will be formed. Furthermore, because of the low surface tension of Dowtherm A, it has a tendency to loosen mill scale from the inside of equipment and pipe lines. A considerable amount of the scale ends up as suspended solids in the Dowtherm A and is carried as suspended solids in the feed stream to the still. These finely divided solids, being heavier than Dowtherm A, tend to settle to the bottom of the still. If not removed more or less continuously, the settling solid particulates will accumulate in a bed, cause plugging, and eventually force shutdown of the still.

One prior art form of still removes the high boiling bottoms of the residue material by means of a valved bottom drawoff line as in U.S. Pat. No. 3,113,090. This requires careful and constant attention by the operator in order to avoid running the still dry or flooding it. Another conventional design incorporates an internal double pipe seal arrangement for withdrawing the bottoms, i.e., the bottoms drawoff line is extended upwardly some distance into the still and is partly enclosed along its upper portion by a larger concentric pipe capped at the top. This arrangement limits the maximum liquid level; however, it renders the still quite sensitive and unstable with respect to changing feed rate. If the feed rate to the still is increased too much, a siphon will form and the entire contents of the still will drain out in a matter of seconds or minutes. When the still thus empties accidentally due to formation of a siphon, there is always the danger that the container in which the residue is collected will overflow. When the liquid seal is broken, high purity vapor will also escape, causing excessive fuming and creating a potential fire hazard. Furthermore, when the unit is thus emptied, equilibrium is upset and cannot be restored until the unit is refilled. Thus, production is lost.

OBJECTS OF INVENTION

The present invention is directed to an improved still of the class described which obviates the aforesaid disadvantages of prior art distillation apparatus.

A specific object of the invention is to provide a compact, economical apparatus for the distillation purification of polyphenyl heat transfer fluids.

Another specific object of the invention is the inclusion of means for positive inherent inventory control without need for liquid level instrumentation.

A further specific object of the invention is the utilization of relatively low cost heat transfer surface in the form of an internal helical pipe coil.

A still further object of the invention is the provision of means to protect against spurious overpressure conditions within the still.

These and other objectives and advantages of the invention will be apparent from the following detailed description thereof.

SUMMARY OF INVENTION

The still of this invention broadly comprises a closed vessel, preferably vertically elongated, in which the feed to be purified is introduced at an intermediate point along the height thereof, essentially pure heat transfer fluid vapors are taken overhead, and the bottoms or residue material containing a substantially higher concentration of high boiling thermal decomposition products than the feed is removed by way of a special internal wellpipe-anti-siphon vent device to be more specifically described hereinafter. The feedstock contains a minor proportion

3

(not more than about 20 wt. percent) of high boiling thermal decomposition products. In view of this, and also the difference in relative volatilities as between the pure heat transfer fluid and the high boilers, a single vapor-liquid contacting stage—the reboiler—is adequate to effect a satisfactory purification of the heat transfer fluid. Therefore, the upper portion of the vessel interior between the feed inlet conduit and the overhead vapor discharge conduit is substantially unobstructed and devoid of liquid-vapor contacting members such as bubblecap decks, perforated trays and the like. Also, the still is nonexternally refluxed, by which is meant that the overhead condensate is not returned to the still. The still is intended to operate at substantially atmospheric or slightly superatmospheric pressure.

The improved still of this invention utilizes an inexpensive internal helical pipe coil for heat transfer surface instead of an outer jacket with the helical coil inside the jacket as used by some related stills of the prior art. Also because of the relatively high condensation temperature of the overhead vapors, an air cooled vapor condenser has proven entirely satisfactory and is a preferred vapor condensation means as against a water cooled bayonet type condenser.

A general embodiment of the invention is found in apparatus for the distillation purification of diphenyl compounds comprising in combination: a closed vessel; a feed inlet conduit connecting with said vessel at a locus intermediate the top and bottom thereof; a helical pipe coil heating means positioned internally within the lower portion of said vessel and below said feed inlet conduit; a vapor discharge conduit connecting with the upper portion of said vessel; vapor condensing means connecting with said discharge conduit disposed externally of said vessel; bottoms draw-off means comprising an internal wellpipe member disposed within said helical pipe coil, said wellpipe member including a vertical lower portion having an open lower terminus closely spaced from and above the bottom of said vessel and an upper portion extending above said pipe coil and thence projecting laterally through the vertical sidewall of said vessel to the exterior thereof; a free-draining downwardly directed residue discharge conduit connecting with the upper terminus of said wellpipe member; and an anti-siphon vent conduit having an upper end portion in open communication with the atmosphere and a lower end connecting with said wellpipe member at substantially the highest elevation of the wellpipe member relative to its lower terminus.

DETAILED DESCRIPTION OF THE INVENTION

The invention may be more clearly understood by reference to the accompanying drawing. The drawing is a sectional elevation view of a preferred embodiment of the purifier including the still itself as well as related auxiliary equipments.

The operation of the still will be described with respect to the purification of Dowtherm A (eutectic mixture of diphenyl and diphenyl ether), although it will be appreciated by those skilled in the art that the apparatus may be employed to purify related polyphenyl or other heat transfer fluids by making appropriate changes in operating conditions.

With reference now to the drawing, the still or purifier, indicated generally by numeral 1, comprises an elongated cylindrical body section 2 closed at its upper end by a pipe cap member 3 welded to the body portion 2. Body section 2 is sealed at its lower end by a blind flange member 4 which in turn is bolted to a mating slip-on flange member 5 welded to section 2.

The feed to the still is impure liquid Dowtherm A comprising from about 1 to about 20 wt. percent high boiling thermal decomposition products, and more commonly from about 5 to about 15 wt. percent high boiling thermal decomposition products. The feed is charged to the still by way of feed inlet conduit 6 and a globe or needle valve 7. The feed may be cold or hot and/or under superatmospheric pressure whereby some flashing of the liquid feed may occur across valve 7. In order to accommodate the resulting mixed phase feed, the feed inlet conduit is extended into the interior of the vessel and then terminates in a downwardly directed 90° bend member 8. The open lower end 9 of the feed inlet conduit is spaced far enough above the operating liquid level 33 to avoid excessive turbulence which would be created by high velocity flash vapor impinging onto this surface of the liquid phase. The downwardly directed feed inlet conduit provides a 180° reversal of direction for incoming vapor feed which in turn promotes some degree of liquid-vapor disengagement at this point.

The liquid body within the still is heated or reboiled by means of a helical pipe coil heating means 11 disposed within the lower portion of the vessel 1 below the elevation of the feed inlet conduit. The pipe coil is normally totally submerged. A suitable heating medium, such as Dowtherm A at elevated temperature, is passed through the pipe coil by way of inlet conduit 10 and outlet conduit 12. If vaporized, Dowtherm A is employed as the heating medium, it is preferred to introduce the hot vapor to conduit 10 and withdraw condensate from conduit 12, as indicated in the drawing. On the other hand, if hot liquid Dowtherm A is employed as a heating medium, it is preferred to pass it through the pipe coil in the reverse direction.

After the still is put on stream and lined out at equilibrium conditions, the high boiling thermal decomposition products will build up to a steady state concentration in the liquid body of from about 50 to about 70% by volume according to A.S.T.M. Engler Distillations. An important feature of the invention resides in the specific means for withdrawing this high boiling bottoms or residue material next to be described.

The bottom, draw-off means comprises an internal wellpipe member 13 positioned within pipe coil 11 extending vertically throughout the height of the pipe coil and having an open lower terminus 14 closely spaced a distance "$d$" above the bottom of the vessel. The wellpipe member may be centered on the central vertical axis of the vessel as indicated, or it may, if desired, be radially off-set from the central vertical axis. The clearance "$d$" is very important to the successful practice of the invention. As previously noted, the impure Dowtherm A contains suspended particulate solids including small particles of solid carbon, mill scale, iron oxide, etc. These finely divided solids, being heavier than Dowtherm A, tend to settle to the bottom of the still. If allowed to accumulate to any appreciable extent, the particulate solids will settle or agglomerate to form a compact bed of substantial depth which in turn will cause plugging and eventual shutdown of the unit. However, by carefully locating the open lower terminus 14 of the wellpipe member a short distance "$d$" above the bottom of the still, there will be an upward sweeping or suction action whereby the solid particles will be carried out of the still via wellpipe 13 more or less continuously and therby preclude any substantial particle accumulation with attendant plugging problems. For best results, the clearance "$d$" should be from about 0.3 to about 3 inches and more preferably from about 0.5 to about 2 inches.

The upper portion of the wellpipe member includes a 90° bend 15 which connects with a horizontal run 16 projecting laterally through the vertical sidewall of the vessel to the exterior thereof. Conduit 16 connects with a pipe T 17 which in turn connects with an anti-siphon vent conduit 18 and a free-draining downwardly directed residue discharge conduit 23.

The anti-siphon vent conduit, in combination with the wellpipe member and downwardly directed residue discharge conduit, constitutes an important and essential part of the invention. As previously noted, in the absence of anti-siphon protection, the hydraulic balance of a system of this type is very sensitive and unstable with respect to change in feed rate. Thus, if the feed valve 7 is opened too much, a siphon will form and cause the entire liquid contents of the still to empty in a matter of seconds or minutes. This is obviated by the instant anti-siphon vent conduit, the upper end portion of which is in open communication with the atmosphere and the lower end of which connects with the wellpipe member at substantially the highest elevation of the wellpipe member relative to its lower terminus, e.g., at pipe T 17. As indicated by the drawing, the anti-siphon vent conduit connects with the lateral extension 16 of the wellpipe externally of vessel 1. This is the preferred construction. However, if desired, the anti-siphon vent pipe could connect with the wellpipe, inside vessel 1; this would necessitate an additional welded connection to the body of the still and so would increase the cost slightly. The elevation "$h$" is preferably at least about 3 feet and may, for example, range from about 3 to about 8 feet in order to allow for slight overpressure conditions which may occur from time to time within the still without spraying the hot residue material into the surrounding atmosphere. However, to guard against the possibility that pressure in the still may exceed atmospheric pressure more than $h$ feet of liquid whereby the liquid would be sprayed into the air, the upper end portion of the anti-siphon vent conduit is provided with an inverted bend segment 19 and a downwardly directed leg 20 which in turn discharges into an overflow receiver 21. Receiver 21 is vented to the atmosphere by way of vent 22.

The free-draining downwardly directed residue discharge conduit 23 is also important and essential to proper operation of the apparatus. The residue material can become quite viscous at room temperature and contains suspended solids. Therefore, it is important to minimize the residence time of the residue material in the discharge conduit system once it has left the still to avoid plugging the discharge conduit. In this regard, the horizontal run 16 should be kept as short as feasible. The residue material is discharged to a residue receiver 24 which is vented to the atmosphere by way of vent 25. The collected high boiling residue material is sent to suitable waste disposal facilities or is otherwise discarded, either continuously as by a pump or intermittently by manually draining the receiver.

The overhead vapors, consisting essentially of pure Dowtherm A and derived in part from flash vapors issuing from the feed inlet conduit and in part from vaporized material leaving the body of liquid, pass upwardly through a vapor disengagement space 34 and then leave the vessel by way of vapor discharge conduit 26. Conduit 26 connects with a free draining air fin condenser 27. The overhead vapors are totally condensed therein and then flow through a vertical leg 28 to condensate receiver 29, the receiver being vented to the atmosphere by way of vent 30. The collected overhead condensate is returned to the main Dowtherm A circulating system, either continuously as by a pump or periodically by manual transfer.

The still, as shown in the drawing, is provided with a lower draw-off line 31 and a gate valve 32. This valve is normally closed and is used merely to empty the unit for periodic cleaning and/or inspection.

The following specific example is given further to illustrate the construction and practice of the invention and is offered for the purpose of exemplification and not with the intent of limitation.

EXAMPLE

A purifier constructed substantially as shown in the drawing is employed to purify Dowtherm A containing 2–10 volume percent high boiling material. The vessel 1 is formed of 12 inch steel pipe, is approximately 57 inches high and has a liquid capacity of about 14 gallons. The unit is started up at a feed rate of 121.7 lbs. per hr. The heating medium is Downtherm A vapor which is condensed in pipe coil 11. The incoming liquid collects in the vessel until the vertical portion of wellpipe 13 is filled whereupon the liquid commences to overflow through residue discharge conduits 16, 23. As the liquid Dowtherm A builds up in the body of the vessel, heat is transferred from the condensing Dowtherm A vapor inside the pipe coil to the body of liquid in the vessel. This addition of heat causes the body of Dowtherm A to boil and give off vapor which is taken overhead via discharge conduit 26 and condensed in the condensed 27. After attianing equilibrium, the purifier is continuously operated at conditions set forth in Table I:

TABLE I

|  | Lbs./hr. | Pressure, p.s.i.g. | Temp., °C. | Enthalpy, B.t.u./lb. | B.t.u./hr. |
|---|---|---|---|---|---|
| Feed: |  |  |  |  |  |
| Before feed valve | 121.7 | 60 | 176 | 124.8 |  |
| After feed valve | 121.7 | 0 | 176 | 124.8 |  |
| O.H. vapor | 117.5 | 0 | 270 | 336.0 |  |
| Purified condensate | 117.5 | 0 | (¹) |  |  |
| Heater duty |  |  |  |  | 25,200 |
| Bottoms | 4.2 | 0 | 272 | 212.5 |  |
| Vapor into pipe coil | 157.5 | ≦30 | ≦316 | 371.3 |  |
| Condensate out of pipe coil | 157.5 | ² 5.6 | 272 | 212.5 |  |

¹ Warm to touch.
² Estimated.

The overhead condensate is essentially pure Dowtherm A. The liquid residue consists essentially of 40% good Dowtherm A and 60% high boiling decomposition products according to A.S.T.M. Engler Distillations. The unit is completely stable with respect to feed rate and no plugging of the bottoms draw-off system will occur.

I claim:
1. Apparatus for the distillation purification of diphenyl compounds comprising in combination:
   (1) a closed vessel;
   (2) a feed inlet conduit connecting with said vessel at a locus intermediate the top and bottom thereof;
   (3) a helical pipe coil heating means positioned internally within the lower portion of said vessel and below said feed inlet conduit;
   (4) a vapor discharge conduit connecting with the upper portion of said vessel;
   (5) vapor condensing means connecting with said discharge conduit disposed externally of said vessel;
   (6) bottoms draw-off means comprising an internal wellpipe member disposed within said helical pipe coil, said wellpipe member including a vertical lower portion having an open lower terminus closely spaced from and above the bottom of said vessel and an upper portion extending above said pipe coil and thence projecting laterally through the vertical sidewall of said vessel to the exterior thereof;
   (7) a free draining downwardly directed residue discharge conduit connecting with the upper terminus of said wellpipe member; and
   (8) an anti-siphon vent conduit having an upper end portion in open communication with the atmosphere and a lower end connecting with said wellpipe member at substantially the highest elevation of the wellpipe member relative to its lower terminus.

2. The apparatus of claim 1 wherein said vessel is vertically elongated.

3. The apparatus of claim 2 wherein the vessel space between said feed inlet conduit and said vapor discharge conduit is substantially unobstructed and devoid of liquid-vapor contacting members.

4. The apparatus of claim 3 wherein the lower terminus of said wellpipe is spaced from about 0.3 to about 3 inches above the bottom of said vessel.

5. The apparatus of claim 4 wherein the lower terminus of said wellpipe is spaced from about 0.5 to about 2 inches above the bottom of said vessel.

6. The apparatus of claim 4 wherein said feed inlet conduit extends into said vessel and thence terminates in a downwardly directed 90° bend whereby to provide a 180° reversal of direction for incoming vapor feed.

7. The apparatus of claim 4 wherein the anti-siphon vent conduit extends upwardly a vertical distance of at least about 3 feet above the lower end of said vent conduit.

8. The apparatus of claim 4 wherein said anti-siphon vent conduit connects with said wellpipe externally of said vessel.

9. The apparatus of claim 4 wherein the upper end portion of said anti-siphon vent conduit terminates in a downwardly directed leg.

10. The apparatus of claim 4 wherein said external vapor condensing means is an air cooled condenser.

References Cited

UNITED STATES PATENTS 1,756,673    4/1930    Baumann _____ 261—115

FOREIGN PATENTS 29,737    1909    Great Britain _____ 202—185

NORMAN YUDKOFF, Primary Examiner

J. SOFER, Assistant Examiner

U.S. Cl. X.R.

202—164, 235; 260—611, 674